UNITED STATES PATENT OFFICE.

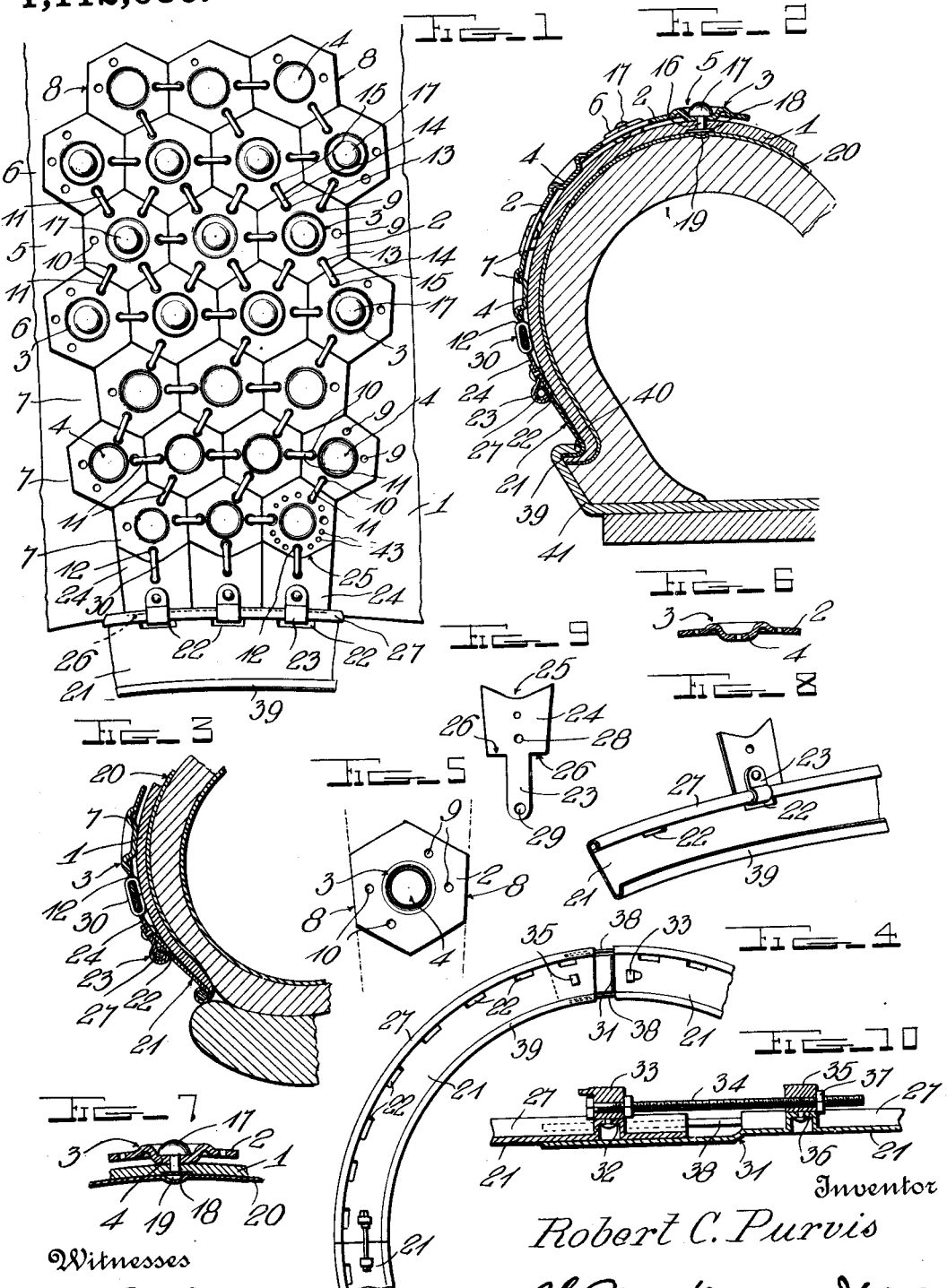

ROBERT C. PURVIS, OF SEAFORD, DELAWARE.

ARMOR FOR PNEUMATIC TIRES.

1,112,030.   Specification of Letters Patent.   Patented Sept. 29, 1914.

Continuation of application Serial No. 410,325, filed January 11, 1908. This application filed July 12, 1910.
Serial No. 571,597.

*To all whom it may concern:*

Be it known that I, ROBERT C. PURVIS, a citizen of the United States, residing at Seaford, in the county of Sussex and State of Delaware, have invented certain new and useful Improvements in Armors for Pneumatic Tires; and I do declare the following to be a full, clear, and exact description of the invention, such as will enable others skilled in the art to which it appertains to make and use the same.

My invention relates to armors for pneumatic tires and more particularly to a complete substantially continuous metal armor which will envelop or surround the entire outer or exposed surface of the rubber shoe or tire and completely protect it, and the present application constitutes a continuation of my prior application for pneumatic tire armors, filed Jan. 11, 1908 Serial No. 410,325.

The principal object of the invention is the provision of a flexible metallic armor which will completely inclose the tire so as to effectively protect it from external abrasions, cuts, punctures, etc., and preclude the possibility of nails, tacks, sharp stones or other objects gaining access to the tire whereby it may be punctured or otherwise injured.

A further object of the invention is to provide a protecting armor of this character which will not only protect the tire from external injury but which will also protect it from extreme internal pressure caused by contact with large objects when the automobile or other machine is running at high speed. This feature, therefore, will effectively prevent all possibility of the tire exploding because of such internal pressure and the wrecking of the machine and the consequent injury to the passengers will be entirely prevented.

A further object of the invention is to provide a complete or practically continuous and impenetrable metallic armor of this character which can be arranged to cover the entire exterior surface of the rubber shoe or tire, and which will at the same time be flexible enough to permit all the natural expansion and contraction of the tire when the machine is in motion.

A still further object of the invention is to provide an armor of this character which will have the above named advantages and which will be at the same time simple in construction, strong, durable and efficient and capable of being readily attached to and detached from, the tire and wheel the attaching means in an advantageous form of the invention also acting as an armor and as a preventive of rim cuts and blow-outs at the point of contact of the tire with the rim.

With the foregoing and other objects in view the invention consists of certain novel features of construction, combination and arrangement of parts as will be more fully hereinafter described and particularly pointed out in the appended claims.

In the accompanying drawings: Figure 1 is a fragmentary side elevation of a portion of a pneumatic tire and rim with part of my improved armor applied, the armor being spread out to more clearly illustrate the construction and arrangement of these parts. Fig. 2 is a fragmentary cross sectional view of a tire with the armor applied thereto, showing the pressure and attaching band used in connection with a clencher tire; Fig. 3 is a similar view showing the armor attached to a single tube or lacing tire; Fig. 4 is a fragmentary side elevation of the attaching and pressure band; Fig. 5 is a top plan view of one of the disks; Fig. 6 is a sectional view of a disk adapted to be secured to an under sheath; Fig. 7 is an enlarged detail sectional view illustrating one method of fastening the armor to an under protecting sheath, this figure also showing the protecting strip or covering which in such cases may cover the rivet heads; Fig. 8 is an enlarged detail view of one form of the connection band and its associated clips; Fig. 9 is a plan view of the clip bank; and, Fig. 10 is a fragmentary sectional view of the band joining or connecting device.

Referring more particularly to the drawing, 1 denotes a flexible sheath or covering which it is ordinarily best to employ in conjunction with the linked metallic armor and which is adapted to overlie the entire tire to which the armor is to be attached, so that the sheath will protect the tire against abrasion by the armor. This armor comprises a plurality of inter-engaged polygonal, and most advantageously substantially hexagonal, disks 2 which constitute the individual protecting elements of the tire armor proper. These disks may be made of any suitable metal and each may be provided with an annular boss 3 and a centrally disposed portion 4. All of the disks are arranged in rows running circumferentially of the tire as shown in Fig. 1, the central row 5 being composed of larger sized disks than those of the next adjacent side rows 6, which latter are in turn larger than the succeeding rows 7. By reducing the sectional area of these disks, I am enabled to bring the edges of the outermost rows of disks in contact with each other so as to prevent any sharp obstacles from entering any portion of the tire, and the armor is also caused to conform to the shape of the tire and fit the same perfectly. If the disks were not graduated thus the armor would be comparatively stiff and could not be made to conform to the outline of the tire. To further insure the perfect fit of the metallic armor and at the same time allow it to have a sufficient amount of flexibility, the central circumferential row of disks is composed of regular hexagons, that is, the diametrically opposite sides of the disks of the central row are parallel, and the disks of all of the other rows are not made of perfect hexagonal shape but have two slightly converging side edges 8 which are disposed substantially in the planes of the radii of the wheel. This peculiar shape and arrangement of the disks will be readily understood on reference to Fig. 1 in which it will be noted that the two side edges 8 of each of the disks (except those of the central circumferential row) are arranged in converging planes and all of these planes radiate approximately from the center of the wheel. This peculiar shape and arrangement of the disks is exceedingly important because it allows the armor to fit the tire perfectly and cover all portions of it, it being understood that the edges of the disks substantially abut or contact, the disks thus affording substantially continuous tire-protecting means. In the disks, I provide openings 9, 10 which receive connecting links 11. These links may consist of suitable lengths of sufficiently heavy wire which are passed through said openings and bent into loops to flexibly connect the disks, the ends of the wire being clenched and preferably brazed or welded together on the under sides of the disks so as to prevent any possible spreading of the parts. By this disposition of the holes 9, 10, the links are arranged in both longitudinal and diagonal rows on the metal armor as will be noted on reference to Fig. 1. The disks of the two outermost rows each have openings to receive the links 11 and also an opening 12 which receives an extra link hereinafter described. In the specific example here illustrated, the disks of the central row 5 have in addition to the four openings 9, 10 two extra openings 13 which receive extra links 14. These links 14 are also arranged in extra openings 15 in the disks of the two side rows 6. This construction therefore is such that the disks of the central row each have six openings engaged by six links while the disks of the two side rows next adjacent the central one, each have five openings engaged by five links. This construction renders the central portion of the metal armor exceedingly strong and it will be noted that this strengthened portion is directly over the tread of the tire where it is of course subjected to the most wear in actual use. Obviously this method of linkage must be confined to a comparatively narrow central strip of the armor, since otherwise the universal flexibility of the armor would be seriously interfered with or destroyed. If desired the disks of the three central rows may be made of case hardened steel which will further increase the durability and strength of the armor. It is to be understood that I may employ other systems of linkage in the tread portion of the armor, that just described being merely illustrative.

The metal armor may be and in some instances advantageously is attached to the protecting sheath 1 by suitable fastening means such as rivets 16, this sheath, where employed, lying between the armor proper and the tire and while these rivets may be arranged all over the armor in each of the disks, I prefer to arrange them in only the disks of the central rows 5, 6 as shown in the drawing. These rivets 16 pass through central openings in said disks and have at their outer ends convex heads 17 which extend slightly above the annular boss 3 so as to assume a proportionate amount of wear. The shank of each rivet has arranged upon it a washer 18 which latter is retained in position by spinning up a portion of the shank to form a head 19. The latter and the washer 18 are of course arranged on the inner side of the sheath 1 and in order to protect the tire from contact with said heads and washer I provide a sheath or strip of fabric 20 which latter may be cemented or otherwise secured to the inner face of the sheath. In order to connect the armor thus described to the felly or rim, as the case may be, I provide an attaching device an advantageous form of which may be best described as follows: A sectional band, 21 divided into quarter sections and held in the form of a circle by devices to be hereinafter described, is provided with a plurality of rectangular openings 22, adjacent its upper edge which are adapted to receive the reduced ends, 23 of connecting clips 24. Each clip 24 is provided with a curved or angular notch 25 in the upper edge of its body, and the sides of the body diverge upwardly. The body of the clip is also shouldered at 26 to abut against the band and limit the movement of the clip so as to prevent the body from entering the openings, 22. In order to strengthen the band 21, I curl the upper edge as at 27 on each section and pass the clips around this curled portion. Each clip is provided with apertures 28 and 29 which aline when the clip is bent around the curled portion 27, and permit a rivet to be inserted therethrough, this arrangement thus affording convenient means of securing the attaching band to the clips. The curved notches 25 in the clips mate with the edges of the lowest or outermost disks and links 30 pass through other openings in the clips and through the openings 12 in said disks, as shown in Fig. 1. In order to prevent any opening or gap between the band sections, I offset one end of each section, as at 31 to overlap the adjacent section, and dispense with the curled portion 27 at this locality. I furthermore form on said adjacent section an upstanding projection 32, which is adapted to receive a lug 33, centrally apertured to receive the connecting screw 34, which engages a similar lug 35, carried by a similar upstanding portion, 36, on the opposite section. An adjusting nut, 37, is carried upon the end of the screw, 34, and abuts against the lug, 35, whereby the relative circumferential positions of said sections may be varied at will. To keep them in perfect alinement circumferentially, I insert in the curled portions, 27, of one section, a short piece of wire, 38, which projects into the curled portions of the opposite section and holds the parts in alinement at all times. When the band is used for clencher tires, the lower curled portion is not curled to its fullest degree, but left in the form of a hook 39, which is adapted to engage under the overhanging flange 40, of the rim 41. When the band is used for single or lacing tires, both edges are curled as at 27, the lower edge abutting the rim. In order to fully protect the tire, the sheath may extend not only under all the armor disks, but also down to the lower edge of the band, 17.

It is to be noted that, with the exception of the central circumferential rows forming the tread of the armor fabric in the specific embodiment of the invention shown in Fig. 1, the disks are so connected together that certain pairs of abutting disk edges are directly linked together and are incapable of appreciable separation; while certain other pairs of abutting edges are not directly linked together and are separable to a slight extent. In the present instance, each of the hexagonal disks in question has one pair of diametrically opposite edges free of direct linkage to the abutting edges of adjacent disks, the remaining four edges of such disks however, being linked to and held constantly in substantial abutment with the contiguous disk edges although capable of very limited sliding movement relative thereto. As is evident from the drawing, these pairs of separable edges are distributed in what may be termed staggered arrangement, and in this instance are oblique to the circumference. This arrangement renders the tire armoring fabric extremely flexible and capable of conforming accurately to the superficial contour of the tire to be protected; while at the same time, the fabric presents for all practical purposes a continuous protecting surface impenetrable by nails, tacks, or other sharp pointed or sharp edged objects. The present armoring fabric is flexible inwardly and outwardly, that is, in opposite directions, to render either side thereof concave or convex.

In the arrangement illustrated, the linkage of the hexagonal disks is such as to give, on both sides of the tread, angling or zigzag lines of abutment, one set of these lines extending circumferentially and two other sets extending in two different general directions obliquely to the tire periphery. In the circumferential abutment lines and in one set of mutually parallel oblique abutment lines, the successive line sections are formed alternately by abutment of free and linked disk edges. In the other set of parallel oblique abutment lines the line sections are all formed by abutment of disk edges directly linked together. The first mentioned set may conveniently be termed variable abutment lines, and the second set, fixed abutment lines; the terms "variable" and "fixed" being understood, of course, in accordance with the foregoing explanation. The variable abutment lines extend convergently from both margins of the armor to the tread or central portion, making equal angles of about 60 degrees in this instance with the circumference, and the lines on each side of the tread being mutually parallel in general direction, as before stated. The fixed abutment lines are similarly arranged but make angles of about 60 degrees with the variable abutment lines and are thus opposed to them in a sense, being also convergent from both margins toward the tread and making equal angles of about 60 degrees with the circumference.

Referring again to Fig. 1, assume the armor to be secured by its margins to a driving wheel of an auto-vehicle, the direction of wheel rotation being toward the left. The central or tread portion of the armor will tend to be pulled to the right by reason of frictional contact with the roadway. This pull is resisted by the parallel lines of links connecting the disks in substantially fixed end-to-end abutment in oblique rows extending from tread to both margins; but owing to the arrangement of variable abutment lines above described, the tread, and in some degrees the disks for some distance both sides thereof, can move circumferentially to a limited extent relatively to the margins, thus automatically crowding the free disk edges into forced abutment so as to positively and constantly maintain a puncture-proof surface. At the same time the armor, on account of its great flexibility is caused by the oblique pull to cling closely to the tire. Such results are unattainable with metallic tire armors heretofore proposed.

It may be remarked that in the specific showing of Fig. 1, the disks are linked in fixed end-to-end abutment in oblique rows parallel in general direction with the oblique "variable" abutment lines before mentioned; while the disks have slight freedom of end-to-end movement in oblique rows parallel in general direction to the "fixed" abutment lines. The fabric may thus be considered as made up of closely fitted substantially hexagonal disks connected by links arranged in parallel V's, the points of the V's lying in the circumferential center line of the armor and the ends of the arms lying in the margins. The V's are connected by circumferential rows of links; but some at least of the disks in both arms of each V have free or unlinked edges mating with free edges of disks in neighboring V's, thus securing great flexibility as described. Viewed in another way, the links connecting any four contiguous disks form parallelograms each of which, over at least a substantial portion of the armor, incloses a line formed by a pair of abutting free or unlinked disk edges, this line lying approximately in the long diagonal of the parallelogram. When the armor is in service on a rotating wheel, a resultant tensile stress is exerted along the long diagonal of the parallelogram, while a compressive thrust is exerted along the short diagonal at right angles thereto and to the inclosed line of free abutment, thus positively forcing the free disk edges together. Consequently, as the disk edges become worn more or less in service by abrasion, etc., with consequent tendency to formation of open spaces between them, this wear is automatically taken up by the oblique pull of the tread against the margins anchored to the wheel rim or felly, and the practical impenetrability of the armor is maintained.

From the foregoing it is evident that the armor should be placed on the tire with particular reference to the intended direction of wheel rotation, that is, in such a way that the ends of the V-arms are in advance with the V-points or vertices following. This insures the requisite oblique tension on the V's when the wheel turns in its usual direction.

If desired I may perforate, as shown at 43 the disks at the side of the tire in order to lessen the weight of the armor. Any number of perforations may be made in each disk and any number of the disks may be perforated. It will be understood that while this armor is especially well adapted for use on various kinds of automobiles, it may be equally as well used on the wheels of machines used in war. An armor constructed in accordance with the invention can be made bullet proof and possibly when the armor is used for this purpose it may be desirable to omit the perforations, 43.

While I have shown and described in detail the preferred embodiment of my invention, I wish it understood that changes in the form, proportion and arrangements of parts and in the details of construction may be made within the spirit and scope of the appended claims. For instance instead of increasing the number of links at the central portion of the metallic armor I may provide simply four openings or apertures in each disk and arrange suitable links in such openings. With this modified system of linkage, each disk in the central circumferential row has two free or unlinked edges which are located on both sides of a linked edge and immediately adjacent thereto, instead of being diametrically opposite each other as in the case of the other disks. This arrangement gives an even more flexible armor than that illustrated in Fig. 1, and for some purposes is preferable thereto.

I claim:

1. An armor for pneumatic tires comprising an inclosing sheath, a plurality of substantially hexagonal disks secured to the sheath arranged in longitudinal rows, the disks of each row gradually decreasing in size from the central longitudinal row outwardly, said disks having apertures in separate pairs of adjoining sides and leaving two diametrically opposite perfectly free sides, links passing through said apertures and arranged in rows extending longitudinally with and diagonally to the circumference of the wheel, the succeeding rows having the disks thereof mating with the disks of other rows with their edges substantially abutting to prevent entrance of foreign articles, means for securing the armor upon the tire, and means to adjust said securing means.

2. An armor for pneumatic tires comprising an inclosing sheath, a flexible metallic sheath composed of a plurality of substantially hexagonal disks arranged in longitudinal rows, the disks of said rows gradually decreasing in size from the central longitudinal row outwardly, two of the opposite sides of certain of the disks being arranged in converging relation and converging in an inward radial direction, said disks also having apertures in separate pairs of adjoining sides and leaving two diametrically opposite perfectly free sides, links passing through said apertures and arranged in rows extending longitudinal with and diagonally to the circumference of the wheel, the succeeding rows having the disks thereof mating with the disks of other rows with their edges substantially abutting to prevent entrance of foreign articles, extra links uniting the disks of the central longitudinal rows and the two next adjacent side rows whereby the tread portion of the tire will be strengthened and means to secure the armor upon the tire.

3. A flexible metallic armor completely inclosing the pneumatic tire and protecting it from internal stress and external injury, said armor being composed of a plurality of flexibly connected substantially hexagonal closely abutting metallic disks, said disks gradually decreasing in size from the central or tread portion of the armor outwardly toward both margins.

4. A flexible metallic armor adapted to completely inclose a pneumatic tire and protect it from internal stress and external injury comprising a plurality of substantially hexagonal metallic disks with the edges of adjacent disks abutting and fitted to conform to the shape of the tire to which it is to be applied, and means for flexibly connecting some but not all of the edges of the disks to hold them in close relation to prevent the entrance of foreign substances between them.

5. In an armor for pneumatic tires, and in combination with a plurality of disks, links flexibly connecting said disks so as to form a number of rows running diagonally to the circumference of the tire to which the device is applied, and links flexibly connecting said disks in circumferential rows, one pair of diametrically opposite edges of each disk being free or unlinked to abutting disk edges.

6. An armor for pneumatic tires comprising a plurality of substantially hexagonal disks with the edges of adjacent disks abutting and fitted to conform to the shape of the tire to which the device is applied, means for flexibly connecting the same so as to form a number of rows running diagonally to the circumference of the tire, and means for flexibly connecting the same to form rows running parallel to said circumference, said disks being free to separate slightly however in oblique or diagonal rows making an angle with the first mentioned diagonal rows.

7. In an armor for pneumatic tires, comprising a plurality of elements, part of which are hexagonal disks having their sides abutting against the sides of other elements or disks, and means for flexibly connecting said hexagonal disks to adjoining disks or elements at two opposite pairs only of converging sides, the remaining sides being free.

8. In an armor for pneumatic tires, and in combination with two substantially hexagonal disks abutting along one of their sides, and two additional similar disks arranged at right angles thereto each having one side abutting with one side of each of the first mentioned disks, means for flexibly connecting said sides of said additional disks to the sides abutting therewith, leaving free the abutting sides of the two first mentioned disks; substantially as set forth.

9. An armor for pneumatic tires composed of a plurality of substantially hexagonal disks with the edges of adjoining disks abutting arranged in longitudinal rows, the disks of the central row being connected on at least four sides to the adjoining disks, and the remaining disks being connected to form longitudinal rows and to form rows oblique or diagonal to the circumference of the tire to which the device is applied, said diagonal rows running substantially at the same angle in relation to said circumference, in one direction, and certain edges of the disks in the oblique rows being free of direct connection to abutting disks.

10. An armor for pneumatic tires comprising an inclosing sheath, a flexible metallic sheath composed of a plurality of substantially hexagonal disks arranged in longitudinal rows, the disks of said rows gradually decreasing in size from the central longitudinal row outwardly, two of the opposite sides of certain of the disks being arranged in converging relation and converging in an inward radial direction, said disks also having apertures in separate pairs of adjoining sides and leaving two diametrically opposite perfectly free sides, links passing through said apertures and arranged in rows extending longitudinally and diagonally to the circumference of the wheel, the succeeding rows having the disks thereof mating with the disks of other rows with their edges substantially abutting to prevent entrance of foreign articles, extra links uniting the disks of the central longitudinal row and the two next adjacent side rows whereby the tread portion of the tire will be strengthened, two securing side bands divided in sections provided with attaching slots, tapered clips having their sides abutting, each mating and abutting with one of the disks of the outer rows, attached to said bands through said slots, means for adjustably connecting adjacent band sections, and positioning means for maintaining said sections in a correct circumferential alinement: substantially as set forth.

11. In an armor for pneumatic tires, the combination, with a sheath for inclosing the tire to be protected, of a flexible metallic sheath composed of a plurality of substantially hexagonal disks connected to each other with their adjacent edges in close abutment to form a substantially continuous covering, said metallic sheath being flexible inwardly or outwardly to render either surface thereof concave or convex, means for connecting said two sheaths together, and means for securing the assemblage in position.

12. Tire armoring fabric comprising a plurality of flexibly connected rigid disks, said disks being arranged close together in a plurality of series or rows and forming a substantially continuous or impenetrable covering of a width sufficient to cover a substantial portion of a tire, said fabric being flexible inwardly and outwardly to render either side thereof concave or convex.

13. Tire armoring fabric comprising a plurality of flexibly connected substantially hexagonal metallic disks fitted close together in a plurality of series or rows and forming a practically continuous or impenetrable covering of a width sufficient to cover a substantial portion of a tire, said fabric being flexible inwardly and outwardly to render either side thereof concave or convex.

14. Tire armoring fabric comprising a plurality of metal disks and linking means flexibly connecting said disks and holding their edges in substantial abutment to form a substantially continuous or impenetrable covering, said linking means being arranged to prevent separation of certain pairs of abutting disk edges while permitting slight separation of other pairs of abutting disk edges.

15. Tire armoring fabric comprising a plurality of metal disks and linking means flexibly connecting said disks and holding their edges in substantial abutment to form a substantially continuous or impenetrable covering, said linking means being arranged to prevent separation of certain pairs of abutting disk edges while permitting slight separation of other pairs of abutting disk edges, such pairs of separable abutting edges being in staggered arrangement.

16. Tire armor comprising a tread portion consisting of polygonal metallic disks flexibly linked together in series extending parallel to the tire circumference, and a plurality of series of similar flexibly linked disks extending obliquely from both sides of such circumferential series to the edges of the tire armor, the oblique rows on each side being all mutually parallel and the shape and arrangement of said disks being such as to form a substantially continuous or impenetrable covering for the entire outer surface of a tire, and means for linking the oblique series of disks to each other and to the circumferential series, such linking means being arranged to permit slight relative movement circumferentially between the central or tread portion of the armor and the marginal portions, whereby, when the tread portion is under circumferential tension in one direction, said disks are crowded together into forced abutment.

17. Tire armor comprising a tread portion and a plurality of rows of polygonal metallic disks extending obliquely from both sides of said tread portion, the shape and arrangement of said disks being such as to form a substantially continuous or impenetrable covering, and means for linking such oblique rows of disks to the tread portion and to each other, such linking means being arranged to permit slight relative movement between the tread portion and the margins of the armor, whereby, when the tread portion is under circumferential tension in one direction, said disks are crowded together into forced abutment.

18. Tire armor comprising a plurality of substantially hexagonal links closely fitted together to form a practically continuous covering, and alined links flexibly connecting said disks, some of the lines of linkage being circumferential and the remainder being oblique, the oblique lines of linkage on each side of a central or tread portion of the armor being all mutually parallel.

19. Tire armoring fabric comprising a plurality of rigid polygonal disks arranged close together and forming substantially continuous and impenetrable covering means, and means flexibly linking said disks together, said linking means being arranged to maintain certain pairs of adjacent disk edges substantially in constant abutment, while permitting slight and variable separation of certain other pairs of adjacent disk edges, whereby enhanced flexibility of the fabric as a whole is secured.

20. Tire armoring fabric comprising a plurality of substantially hexagonal disks arranged close together and forming substantially continuous and impenetrable covering means, and linking means flexibly connecting said disks, said linking means being arranged to maintain two oppositely disposed pairs of adjacent edges of a disk substantially in constant abutment with the mating edges of two pairs of adjacent disks while permitting slight and variable separation of the remaining two diametrically opposed edges of said disk from the corresponding edges of the two disks adjacent said diametrically opposed edges.

21. Tire armor comprising a plurality of substantially hexagonal metallic disks set close together in parallel circumferential rows, said disks decreasing somewhat in size from the central row toward both margins, links flexibly connecting the disks of each said row in substantially fixed circumferential end-to-end abutment, links flexibly connecting said disks in substantially fixed end-to-end abutment in rows extending obliquely from both margins toward the tread of the armor and making substantially equal angles therewith, the oblique rows on each side of such tread being all mutually parallel, and said disks having slight freedom of end-to-end movement in parallel rows on both sides of and oblique to such tread and at an angle to the first mentioned oblique rows.

22. The combination with a wheel and a resilient tire mounted thereon, of tire armor comprising flexibly connected polygonal metal disks fitted close together with their edges substantially abutting to form a flexible metallic sheath substantially free of interstices between its component disks and completely covering the entire outer or exposed surface of said tire.

23. The combination with a wheel and a resilient tire mounted thereon, of tire armor comprising flexibly connected polygonal metal disks fitted close together with their edges substantially abutting to form a flexible metallic sheath substantially free of interstices between its component disks and completely covering the entire outer or exposed surface of said tire, and an auxiliary flexible non-metallic sheath interposed between said metallic sheath and said tire.

In testimony whereof I have hereunto set my hand in presence of two subscribing witnesses.

ROBERT C. PURVIS.

Witnesses:
  C. H. GRIESBAUER,
  L. O. HILTON.

Copies of this patent may be obtained for five cents each, by addressing the "Commissioner of Patents, Washington, D. C."